United States Patent [19]
Campbell

[11] 4,010,970
[45] Mar. 8, 1977

[54] WASTE RECEIVER FOR DOGS

[76] Inventor: John R. Campbell, 776 Holly St., New Milford, N.J. 07646

[22] Filed: Apr. 21, 1976

[21] Appl. No.: 678,990

Related U.S. Application Data

[63] Continuation-in-part of Ser. No. 540,841, Jan. 14, 1975, abandoned.

[52] U.S. Cl. .............................. 294/19 R; 294/1 R
[51] Int. Cl.² ......................................... A01K 29/00
[58] Field of Search ......... 294/1 R, 19 R, 55, 99 R, 294/100, 115, 116; 15/257.1, 257.7; 119/1; 150/3, 5, 12; 229/62, 64, 66; 248/95, 99, 100

[56] References Cited

UNITED STATES PATENTS

| | | | |
|---|---|---|---|
| 3,346,883 | 10/1967 | Ersek | 150/3 X |
| 3,446,525 | 5/1969 | Jones | 294/19 R |
| 3,576,342 | 4/1971 | Page | 294/100 X |
| 3,738,697 | 6/1973 | Kahan | 294/19 R |
| 3,786,780 | 1/1974 | Pezzino | 294/19 R X |
| 3,819,220 | 6/1974 | Bredt | 294/19 R |
| 3,848,841 | 11/1974 | Rafeldt | 248/99 |

*Primary Examiner*—Johnny D. Cherry

[57] ABSTRACT

A waste receiver for canine toilet use has a handle and two spread-apart arms at the end of the handle. A plastic bag with an open top has two upper tubular edge portions which are slipped over the arms and support the bag in an open position. By means of the handle, the bag is placed below a pet to receive droppings therein. The upper inner edges of the bag incorporate closure means which are used to seal the bag closed after use. In one form, a mechanism on the handle closes the arms to at least partially seal a bag before its removal from the arms. In another form, spring arms meet at their tips to apply pressure and seal a bag as it is being removed from the arms.

20 Claims, 17 Drawing Figures

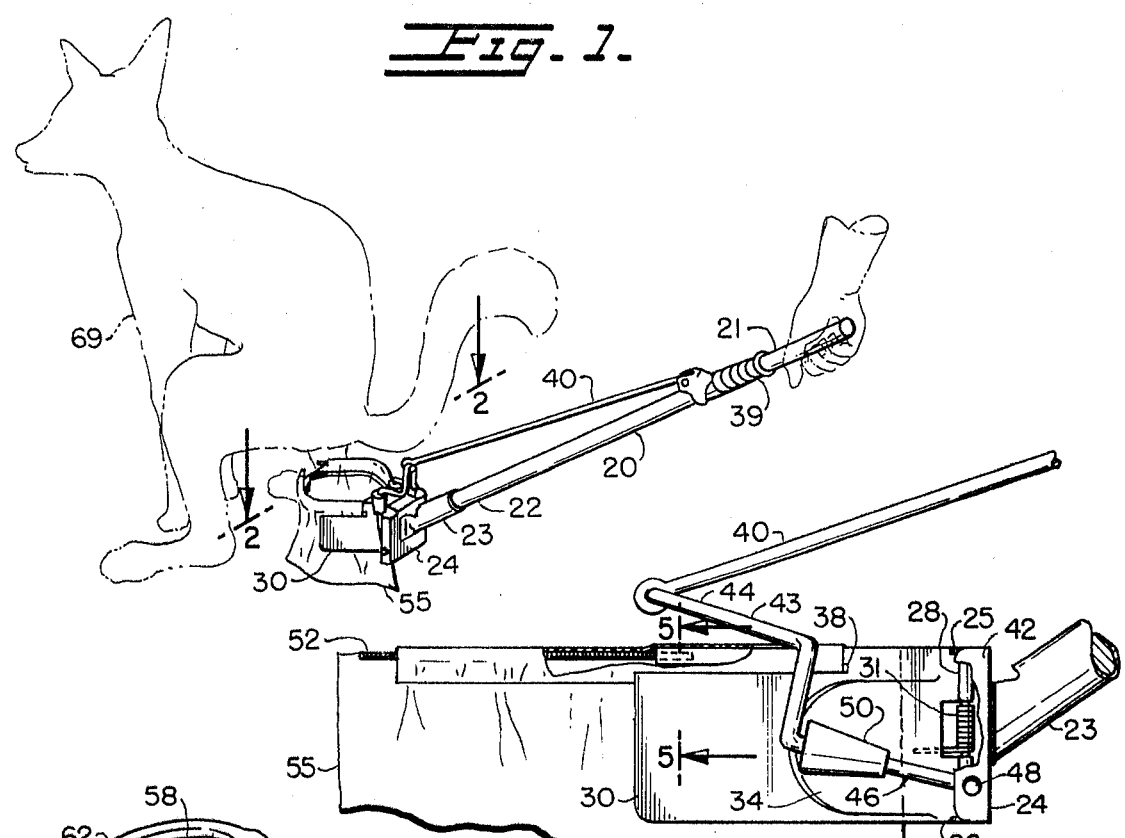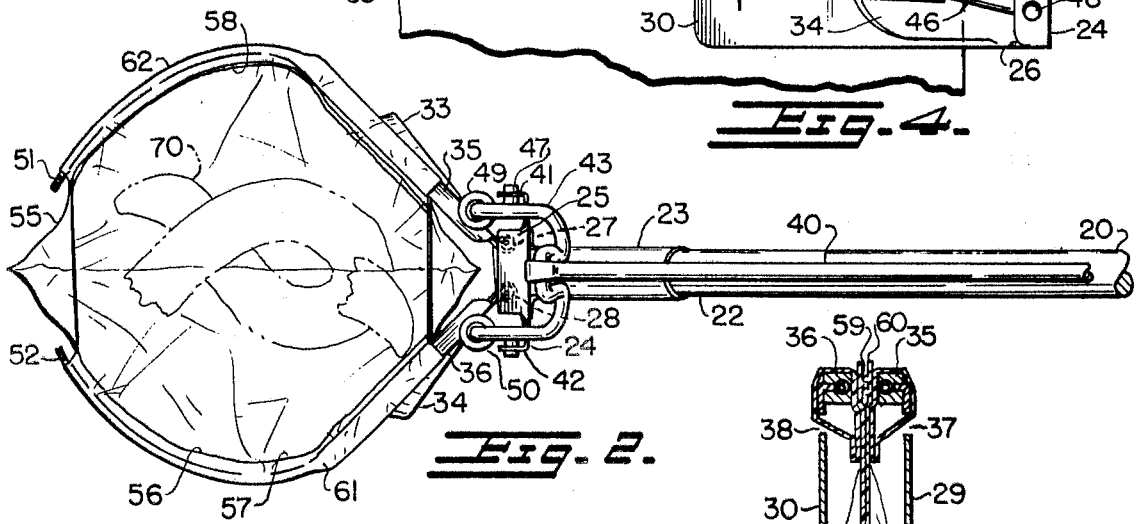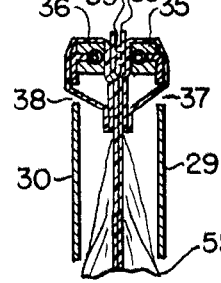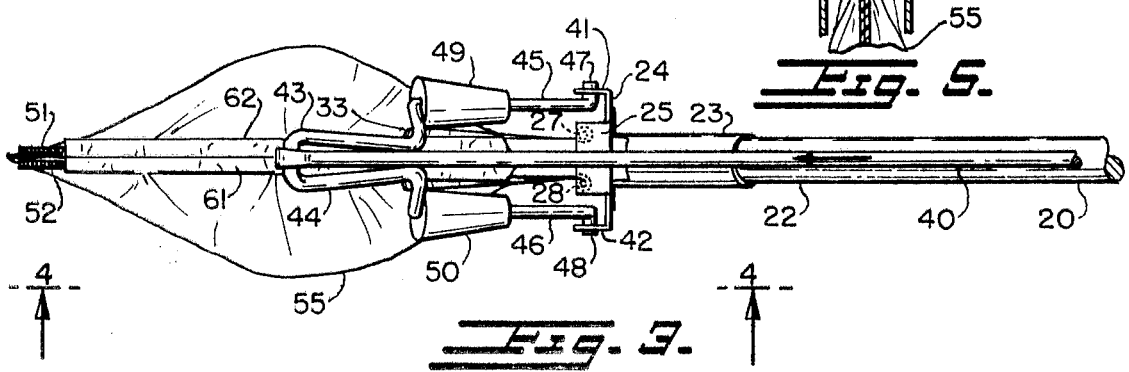

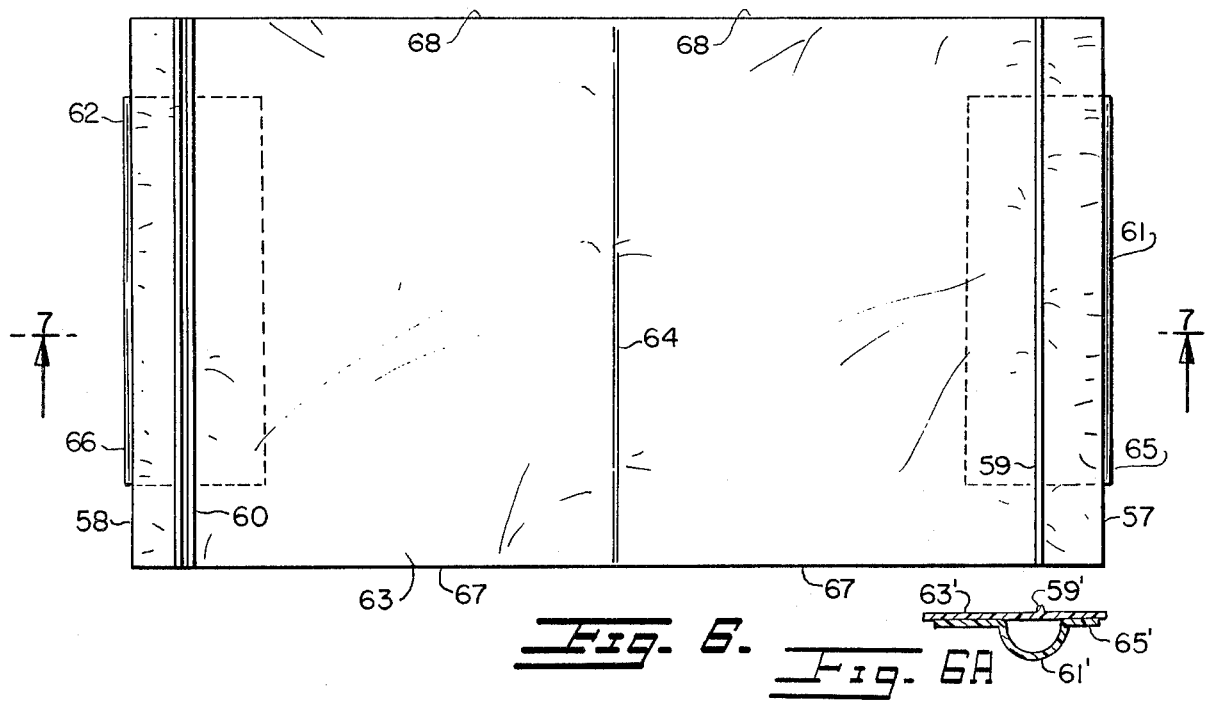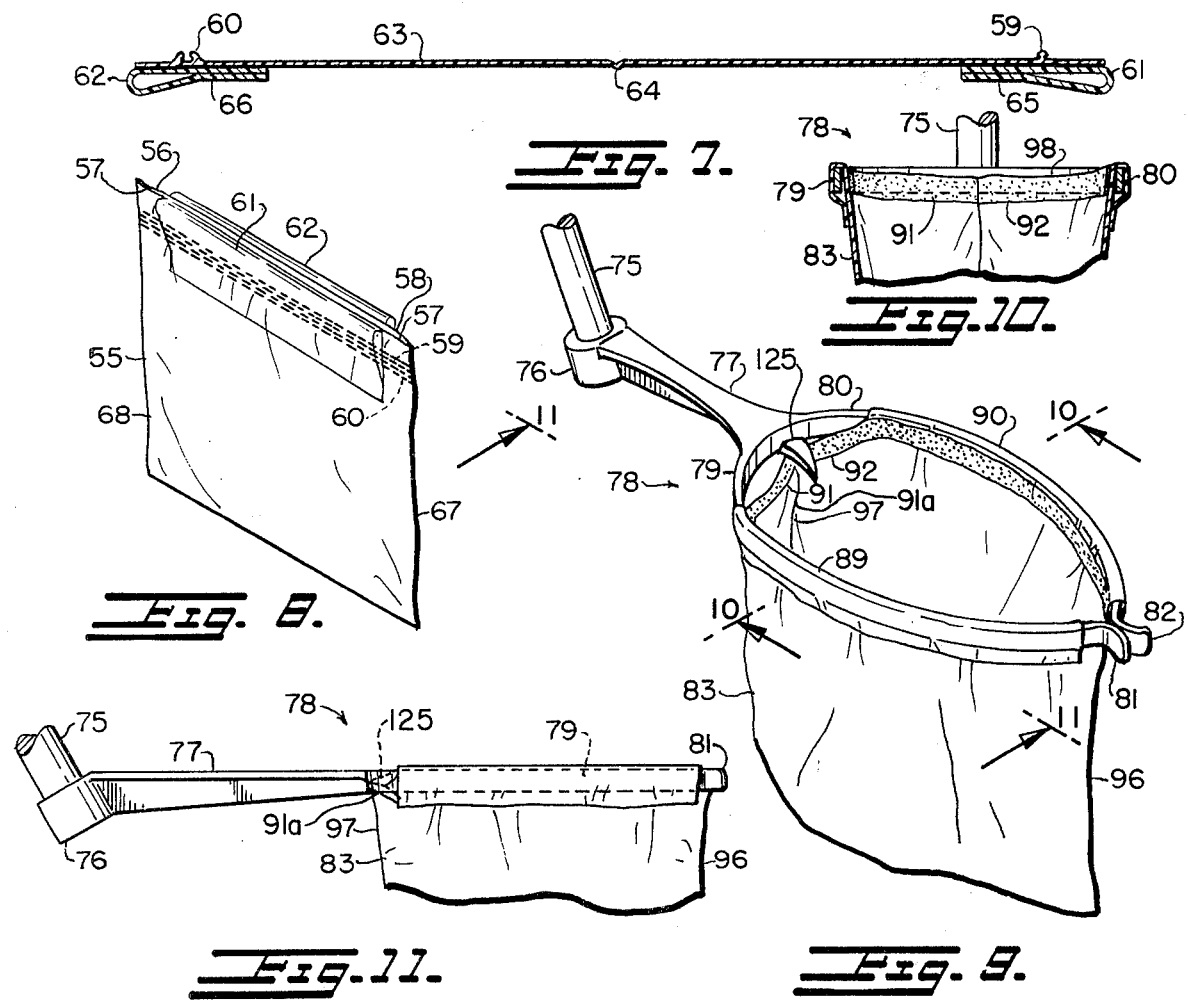

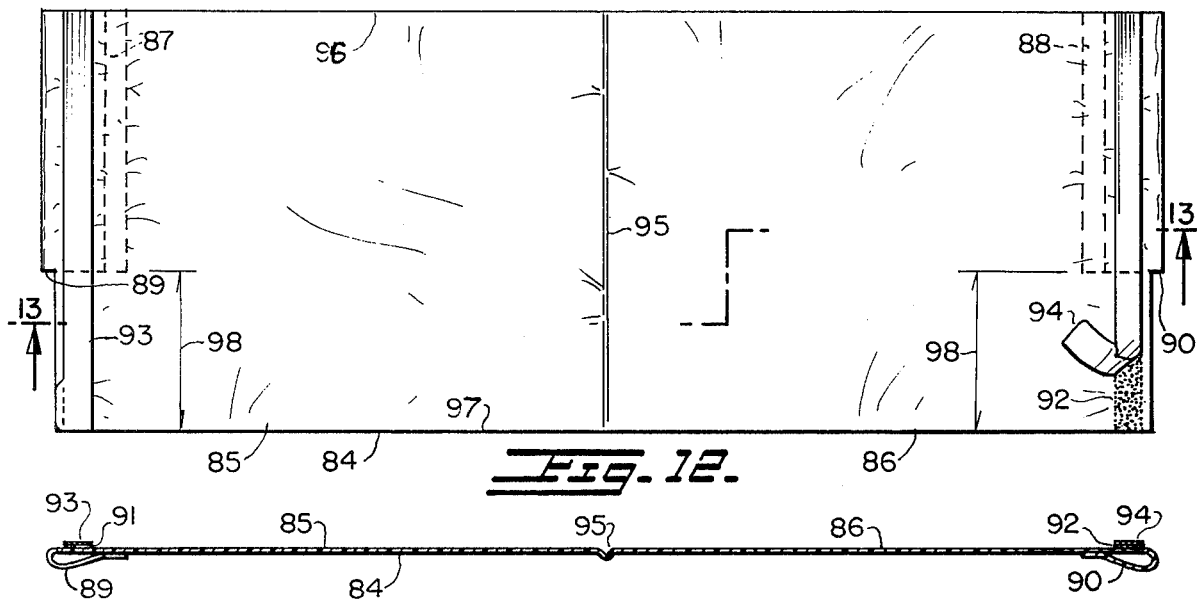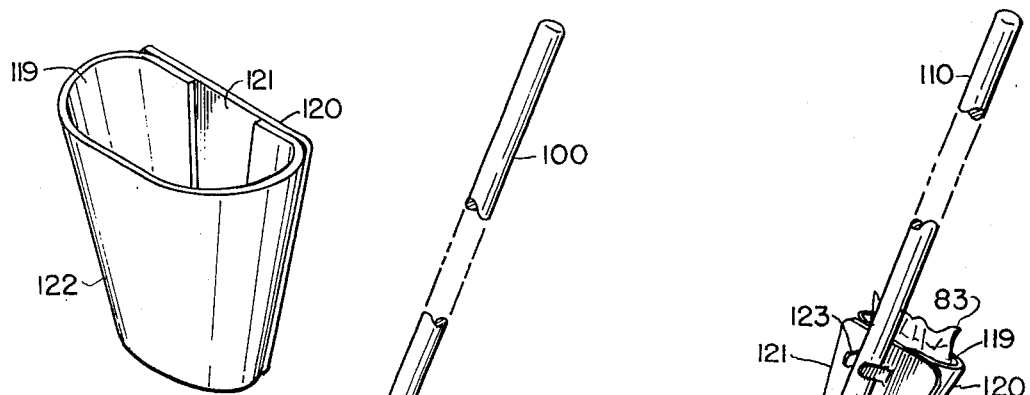

WASTE RECEIVER FOR DOGS

CROSS REFERENCES TO RELATED APPLICATIONS

This application is a continuation-in-part of U.S. Pat. application Ser. No. 540,841 filed Jan. 14, 1975 and now abandoned.

BACKGROUND OF THE INVENTION

1. Field of the Invention

This invention relates generally to anti-pollution devices and, more particularly, to a portable toilet apparatus for receiving canine waste products for disposal in sealed plastic bags.

2. Description of the Prior Art

There are many devices used to scoop up solid animal wastes. These devices are difficult to use and are never completely effective as they require the prior violation and soiling of curbs and streets by dogs.

SUMMARY OF THE INVENTION

This invention provides a compact, hand-held canine, feline or other animal or pet toilet apparatus which holds a bag of plastic, paper, or other suitable material in an open position at the end of a handle. Once this apparatus is thrust under a pet while it is in the act of defecating, the pet soon becomes accustomed to the use of the invention. It is then a simple matter to catch solid animal wastes as they are expelled. It can, of course, be used to catch all waste matter or droppings discharged from the body such a vomit, urine or feces.

A first embodiment of this invention provides a handle with a mechanism to spread and close two articulated arms hinged to the end of the handle. The bases of the articulated arms form solid jaws and the ends of the arms are of flexible or spring material. A plastic bag having an open top with tubular edges is placed with the arms extending through the tubular edges. The inner upper bag edge may have an integrally molded plastic interlocking zipper formed on it, or a pressure sensitive tape or other fastening means may be applied to the inner edge of the bag opening. The arms are spread to hold the bag open when it is thrust under an animal to receive droppings. When the bag is removed, the mechanism is manipulated to close the arms so that the jaws at least partially seal the bag by crushing the fastening means together between them. The bag is then slipped from the arms, the seal is completed, and the bag and its contents are discarded. A practical and sanitary waste receiver for dogs is thus provided.

Another and preferred embodiment of this invention has permanently open spring arms that are fixed to the end of a handle and curve together and touch at their free ends to exert a resilient pressure. The arms are forced apart and the tubular edges of a bag are slipped over the arms to hold the bag open thereon. If a pressure sensitive fastening means is used, a covering strip may be removed from the bag after it is fixed on the arms. After use, the bag is pulled off the arms and the resilient pressure at the arm tips forces the edges of the bag opening together to seal it. The arms may be of spring steel, plastic, or wire. A plastic container for used bags may be snapped to the handle.

This invention provides a sanitary, easily used, and practical device which will allow dog owners to enjoy their pets despite new and threatened sanitary ordinances.

BRIEF DESCRIPTION OF THE DRAWINGS

FIG. 1 is a perspective view of the waste receiver for dogs according to my invention with a dog shown in phantom lines;

FIG. 2 is a top view of the apparatus of FIG. 1 shown in the open bag position after use;

FIG. 3 is a top view of the apparatus of FIG. 1 shown in the closed bag position after use;

FIG. 4 is a side view of a broken away portion of the apparatus taken on line 4—4 of FIG. 3;

FIG. 5 is a section taken on line 5—5 of FIG. 4;

FIG. 6 is a plan view of a bag blank having an integrally formed interlocking closure;

FIG. 6A is a longitudinal section taken through a fragment of the end of a bag blank showing the attachment of a modified tubular element;

FIG. 7 is a section taken on line 7—7 of FIG. 6;

FIG. 8 is a perspective view of a complete bag formed from the blank of FIG. 6;

FIG. 9 is a perspective view of a preferred embodiment of this invention with the handle broken away;

FIG. 10 is a section taken on line 10—10 of FIG. 9 with the handle and lower portion of the bag broken away;

FIG. 11 is a side view taken on line 11—11 of FIG. 9 with the handle and lower portion of the bag broken away;

FIG. 12 is a plan view of a bag blank having a pressure sensitive closure means;

FIG. 13 is a section taken on line 13—13 of FIG. 12;

FIG. 14 is a perspective view of a bag holder according to a first embodiment of the preferred embodiment of this invention;

FIG. 15 is a perspective view of a bag holder according to a second modification of the preferred embodiment of this invention with a container for used bags shown clipped to the handle thereof; and FIG. 16 is a perspective view of the container for used bags shown in FIG. 15.

DESCRIPTION OF THE PREFERRED EMBODIMENTS

Referring to FIGS. 1–5, a first embodiment of my invention has a handle 20 with a hand held upper end 21. Handle 20 may be of wood of sufficient diameter to form a comfortable hand hold. It may also be of any other suitable material. The lower end 22 of handle 20 is fixed in socket 23 which is welded to the back of bracket 24 at a suitable angle so that bracket 24 is substantially vertical. Bracket 24 has upper and lower forwardly bent flanges 25 and 26 which receive the pins 27 and 28 to pivotally mount the plates 29 and 30. A coil spring 31 urges each plate 29 and 30 to swing outward. Tapered bosses 33 and 34 are pressed to extend outward from the sides of the plates 29 and 30 to a greater extent toward their free ends.

As may be particularly seen in FIGS. 2 and 4, rigid solid jaws 35 and 36, which may be substantially square in section, are attached to be cantilevered forward above plates 29 and 30 forming the slots 37 and 38 thereunder. An actuator 39 slides on handle 20 and has a rod 40 connected to it. Referring additionally to FIG. 3, side flanges 41 and 42 are bent forward from bracket 24. Member 43 is vertically pivoted from the flanges 41 and 42 by the arms 45 and 46 which terminate in the outward turned ends 47 and 48 which enter the flanges 41 and 42. The central portion 44 of member 43 is pivotally connected to rod 40. Arms 45 and 46 have tapered rollers 49 and 50 mounted on them. Pushing the actuator 39 toward bracket 24 causes the tapered rollers 49 and 50 as shown in FIG. 2 to roll forward and down over bosses 33 and 34 to close jaws 35 and 36. When the jaws 35 and 36 are closed as shown in FIGS. 3, 4 and 5, pulling the actuator 39 toward end 21 of handle 20 will allow the springs 31 to open jaws 35 and 36 to the position shown in FIGS. 1 and 2. The ends of the jaws 35 and 36 have the flexible ends 51 and 52 fixed to extend therefrom so that the jaws 35 and 36 and the flexible ends 51 and 52 form a pair of arms.

As shown in FIGS. 6, 7 and 8, a bag 55 has a top opening 56. The sides 57 and 58 of opening 56 have integrally formed interlocking male and female fastening means 59 and 60 formed thereon. Fastening means 59 and 60 may be a rib interference zipper. Outside and adjacent to the fastening means 59 and 60, the sides 57 and 58 of opening 56 have the tubular edge portions 61 and 62 fixed thereto to extend at least partially along the sides of opening 56. Bag 55 is formed from a substantially rectangular blank 63 as shown in FIGS. 6 and 7. Tubular edge portions 61 and 62 are fixed at the ends of blank 63 by folding lengths 65 and 66 into loops and heat sealing them in place. The blank 63 is then folded about its center 64 and its side edges 67 and 68 are heat sealed or otherwise joined. Alternatively, the lengths 65 and 66 may be formed integrally with blank 63 and folded back on blank 63 to form the tubular portions 61 and 62 by heat sealing.

As shown in FIG. 6A, a bag blank 63' may have a tubular portion 61' fixed thereto. Tubular portion 61' is formed from a length of bag material 65' which is heat sealed above and below the fastening means 59'.

As may be seen in FIGS. 1 and 2, bag 55 has its tubular edge portions 61 and 62 pulled over the flexible extensions 51 and 52 and jaws 35 and 26 which form a pair of arms. The jaws 35 and 36 are opened to support bag 55 at the ends of handle 20 in an open position. As a dog 69 defecates, an open bag 55 is thrust below it as shown to catch droppings 70. Upon catching droppings 70, actuator 39 is pushed forward to snap jaws 35 and 36 together closing bag 55 and locking the fastening means 59 and 60 at least partially along the top of opening 56 where it extends between jaws 35 and 36. The partially sealed bag 55 is then pulled from jaws 35 and 36 and the sealing is completed by hand before discharging bag 55 and its contents.

The device of this invention is sanitary and easy to use. Dogs rapidly get used to it and have been known to run happily to the door to go out when the device is produced. It is also suitable for indoor training as in an apartment house.

Referring now to FIGS. 9, 10 and 11, a preferred embodiment of my invention has a handle 75 which enters socket 76 on the shank 77 of bag holder 78. Bag holder 78 terminates in the spread-apart arms 79 and 80 that curve together to touch and maintain a resilient pressure between their outward flaring ends 81 and 82. The holder 78 is best molded of plastic to have resilient arms 79 and 80. It may also be forged and tempered from a suitable spring metal such as steel or brass.

As may be seen in FIGS. 9, 12 and 13, a bag 83 is formed from a generally rectangular blank 84 which is substantially rectangular. Two side panels 85 and 86 of blank 84 have end extensions 87 and 88 that are folded back to be heat sealed or otherwise fixed to form tubular edges 89 and 90. Contact cement strips 91 and 92, covered by tapes 93 and 94 until exposed to be used, are formed along the outer edges of the side panels 85 and 86. Bag 83 is formed by folding blank 84 on its center 95 and heat sealing or otherwise joining the side edges 96 and 97. It is to be noted that the tubular edges 89 and 90 of the completed bag 83 extend from side edge 96 and terminate a distance 98 from side edge 97, distance 98 being at least equal to one-half the maximum distance the curved arms 79 and 80 extend apart.

As shown in FIG. 9, the arms 79 and 80 are inserted in the tubular edges 89 and 90 from side edge 97. The arm ends 81 and 82 may be sprung slightly apart during this insertion. The distance 98 of the tubular edges 89 and 90 from edge 97 enables the bag 83 to have the arms 79 and 89 forced through the tubular edges 89 and 90 without tearing the bag as the distances 98 open to span the maximum spread of the arms 79 and 80. The holder 78 suspends bag 83 in an open position. The tape strips 93 and 94 are removed and the bag 83 is thrust below a pet to receive animal droppings. Bag 83 is withdrawn from the pet and bag 83 is drawn or pulled off the arms 79 and 80 and, while being so removed, the tips or ends 81 and 82 push the contact cement strips 91 and 92 together to completely seal bag 83 and its contents so that bag 83 may be discarded. With this embodiment of the invention, the bag 83 may be sealed and withdrawn from its holder 78 in one motion. It should be noted that the strips of contact cement 91 and 92 are formed to extend along the inner portions of the tubular edges 89 and 90. If desired, the tape strips 93 and 94 may be removed after a pet has used bag 83.

As shown in FIGS. 9 and 11, an inwardly and downwardly extending finger 125 may be formed between the arms 79 and 80 to engage inner and rearward edge 91a of bag 83. The purpose of this finger is to prevent the edge 91a which is unsupported between the arms 79 and 80 from moving upward when the bag is partially collapsed when in the position shown in FIG. 1 and the bottom of the bag is somewhat compressed against the ground. It has been found that with some bags the edge 91a is moved upward and forward due to inherent stability of the material of which the bag is formed. The finger 125 retains the bag in the fully opened position.

It should be understood that strips of contact cement 91 and 92 may be replaced by any pressure sensitive fastening means that are closed by pressure, such as adhesive, Velcro hooks, rib interference zippers, and the like. It should also be noted that the art of using pressure sensitive adhesives has now reached the point where tapes such as covering tapes 93 and 94 may be omitted.

FIG. 14 shows a first modification of the second and preferred embodiment of my invention. A handle 100 terminates in a socket 101 formed by a loop of spring steel band material. A shank 102 is formed from two runs of the spring steel that extend from socket 101 and are joined together by welding if required. The shank 102 diverges to form the two curved arms 103 and 104 that terminate in the touching tips 105 and 106. The spring steel bag holder 107 is used in the same manner as has been described for the holder 78 with a bag 83.

FIG. 15 shows a second modification of my preferred second embodiment of this invention. A handle 110 has its lower end fixed in a loop 111 forming a socket of a spring wire bag holder 112. A twisted wire shank 113 extends from socket or loop 111 to diverge and form the curved arms 114 and 115 which terminate in the touching ends 116 and 117 which may have plastic or metal large diameter tips fixed on them. The spring wire bag holder 112 is used in the manner which has been described with bag 83.

FIGS. 15 and 16 show a used bag or a bag supply container 120 which has an open top 119. Container 120 has a flat back wall 121 and a curved front wall 122. Clips 123 and 124 fix the container 120 to handle 110.

The second embodiment of my invention is inexpensive to fabricate, easy to use, sanitary, and efficient. The handle should extend up at an obtuse angle from the shank to make it easy to position the arms and a bag supported thereby horizontally below a pet. Bags may be of paper and other material as well as plastic film such as polyethylene. While the second and preferred embodiment of this invention has been shown as having pressure sensitive contact cement strips 91 and 92 as a sealing means, interlocks such as shown with the first embodiment of the invention may be used, as well as any other sealing means that only needs to be pressed together.

I claim:

1. A waste receiver for pet toilet use comprising, in combination, a handle having a hand held portion and a lower end, spread-apart arms attached at the lower end of said handle, a bag hving a top opening with two sides of said opening, tubular portions of said bag extending at least partially along the outside of said top opening, fastening means extending within said sides of said opening, said arms being inserted in said tubular portions supporting said bag in an open position to be held by said hand held portion of said handle to catch pet droppings, and said arms being constructed and arranged to form means enabling said arms to at least partially seal said bag by engaging said fastening means.

2. The combination according to claim 1 wherein said arms are resilient and have ends, said arms curving and said ends contacting each other to form said means enabling said arms to at least partially seal said bag by the engagement of said fastening means by said ends, said bag on being pulled from said arms having said ends of said arms press said fastening means together sealing said bag.

3. The combination according to claim 2 wherein said fastening means is a pressure sensitive cement strip, and with the addition of at least one protective strip convering said cement strip, said protective strip being removed on use of said bag.

4. The combination according to claim 2 wherein said tubular portions extend from one end of said opening and terminate a distance from the other end of said opening, said distance being at least one-half the maximum spread of said arms.

5. The combination according to claim 4 wherein said tubular portions are extensions folded downward and fixed to said bag.

6. The combination according to claim 2 wherein said handle is a dowel, and with the addition of a shank having a socket to receive the lower end of said dowel at an obtuse angle with said shank, said arms extending horizontally from said shank and being integrally formed therewith.

7. The combination according to claim 6 wherein said socket, said shank, and said arms are formed from a single length of spring material, said socket being bent from a central loop of said spring material, said shank being two joined runs of said spring material with said arms being separated ends of said spring material extending from said shank.

8. The combination according to claim 7 wherein said length of spring material is spring wire, said shank being wires twisted together and extending from said socket, said arms having ends with large diameter tips fixed thereon.

9. The combination according to claim 2 with the addition of an inwardly and downwardly bent finger extending downward between said arms, said finger extending into the top opening of said bag when said arms are inserted in said tubular portions supporting said bag in an open position.

10. The combination according to claim 1 wherein said arms are pivotally attached to said lower end of said handle, said arms having rigid jaws with flat inner faces extending from said handle and said arms having flexible ends extending from said jaws, said fastening means being disposed adjacent said flat inner faces of said jaws, and with the addition of actuating means opening said arms holding a bag in an open position and closing said arms, said flat inner faces of said jaws forcing together and engaging said fastening means therebetween.

11. The combination according to claim 10 wherein said tubular portions of said bag are lengths of bag material fixed along the outside of said top opening.

12. The combination according to claim 11 wherein said lengths of bag material each have upper and lower portions, said upper and lower portions both being fixed along the outside of said top opening.

13. The combination according to claim 11 wherein said lengths of bag material are folded into loops and fixed along the outside of said top opening.

14. A waste receptacle for pet toilet use adapted to be supported by curved cooperating arms having free ends which touch each other, said receptacle having a top opening with two sides of said opening, tubular portions of said receptacle extending at least partially along the outside of said top opening, pressure sensitive fastening means extending within and along at least one side of said opening and in a parallel position to said tubular portions in a plane parallel to the plane of said opening, whereby said receptacle may be supported along said tubular portions by said arms and said fastening means are closed when engaged by said arms during withdrawal of said receptacle over the touching free ends of said arms.

15. The receptacle according to claim 14 wherein said fastening means is a pressure sensitive cement strip and with the addition of at least one protective strip covering said cement strip, said protective strip being removed on use of said receptacle.

16. The receptacle according to claim 14 wherein said tubular portions extend from one end of said opening and terminate a distance from the other end of said opening, said distance being at least one-half the maximum distance it is intended to spread said receptacle.

17. The receptacle according to claim 16 wherein said tubular portions are extensions folded downward and fixed to said receptacle.

18. The receptacle according to claim 14 wherein said pressure sensitive fastening means is a pressure sensitive adhesive.

19. The receptacle according to claim 14 wherein said pressure sensitive fastening means are Velcro and are secured on two sides of said opening.

20. The receptacle according to claim 14 wherein said pressure sensitive fastening means is an interference zipper secured on each side of said opening.

* * * * *